(12) United States Patent
Villa

(10) Patent No.: US 7,653,863 B2
(45) Date of Patent: Jan. 26, 2010

(54) DATA STORING METHOD FOR A NON-VOLATILE MEMORY CELL ARRAY HAVING AN ERROR CORRECTION CODE

(76) Inventor: Corrado Villa, Via S. Francesco, 31, 20050-Sovico (MI) (IT)

( * ) Notice: Subject to any disclaimer, the term of this patent is extended or adjusted under 35 U.S.C. 154(b) by 616 days.

(21) Appl. No.: 11/411,010

(22) Filed: Apr. 25, 2006

(65) Prior Publication Data

US 2006/0259847 A1    Nov. 16, 2006

(30) Foreign Application Priority Data

Apr. 29, 2005    (IT)    ............ MI2005A0780

(51) Int. Cl.
*G11C 29/00*    (2006.01)
(52) U.S. Cl. ............................................. 714/773
(58) Field of Classification Search .......... 714/766, 714/773
See application file for complete search history.

(56) References Cited

U.S. PATENT DOCUMENTS

| | | | | |
|---|---|---|---|---|
| 5,471,478 A | * | 11/1995 | Mangan et al. | 714/711 |
| 5,603,001 A | * | 2/1997 | Sukegawa et al. | 711/103 |
| 5,928,370 A | * | 7/1999 | Asnaashari | 714/48 |
| 6,587,382 B1 | * | 7/2003 | Estakhri et al. | 365/185.29 |
| 6,941,505 B2 | * | 9/2005 | Yada et al. | 714/763 |
| 6,961,890 B2 | * | 11/2005 | Smith | 714/763 |
| 7,321,959 B2 | * | 1/2008 | Honda et al. | 711/156 |
| 7,325,157 B2 | * | 1/2008 | Sesek et al. | 714/8 |
| 7,424,593 B2 | * | 9/2008 | Estakhri et al. | 711/209 |

* cited by examiner

*Primary Examiner*—Stephen M Baker
(74) *Attorney, Agent, or Firm*—Trop, Pruner & Hu, P.C.

(57) ABSTRACT

An array of non-volatile memory cells includes a row with N cells and M cells. In a partial-storage step, a datum is stored in a first portion of the N cells of the row. A second portion of the N cells of the row are in an "erase" state. A first error correction code associated with the datum is stored in the M cells along with a first enable bit or guard-cell which is indicative of whether the first error correction code is active. The number of M cells, adjacent to the N cells of the row, is defined on the basis of the number N of cells. In the event the datum stored in the first portion of the N cells of the row is subsequently updated or manipulated, a second error correction code associated with the updated or manipulated datum is determined and stored in the second portion of the N cells of the row along with a second guard-cell which is indicative of whether the second error correction code is active. At that point, the first guard-cell is modified to indicate that the first error correction code is not active.

28 Claims, 6 Drawing Sheets

DATA STORING METHOD FOR A NON-VOLATILE MEMORY CELL ARRAY HAVING AN ERROR CORRECTION CODE

PRIORITY CLAIM

The present application claims priority from Italian Patent Application No. MI2005A 000780 filed Apr. 29, 2005, the disclosure of which is hereby incorporated by reference.

BACKGROUND OF THE INVENTION

1. Technical Field of the Invention

The present invention relates to a storing method for a non-volatile memory cell array with error correction code (such as a code used for identifying and correcting, in the reading step, a possible faulty cell containing a wrong stored datum).

The present invention also relates to a memory electronic device comprising non-volatile memory cells organized with a plurality of arrays of N memory cells, which is able to store data or information as a group of bits, each array being associated with an error correction code to identify and recover a possible faulty cell containing wrong bits.

The invention particularly, but not exclusively, relates to a memory device of the Flash type and the following description is made with reference to this field of application by way of illustration only.

2. Description of Related Art

As is well known, memory electronic devices with non-volatile memory cells of the Flash type are widely used to store a huge amount of information in a compact support, with high capacity and reliability.

Non-volatile memory electronic devices are devices integrated on a semiconductor substrate comprising a plurality of cells normally organized in a matrix, comprising a plurality of sectors each with rows and columns of cells.

The cells of Flash memories can be of the two-level type, and in this case the values stored can be two, corresponding to a logic value 0 and to a logic value 1 which, from the electric point of view, make reference to a value of the threshold voltage Vth. The amount of information being stored in such a functional context is equal to one bit per cell.

Alternatively, Flash memory cells can be of the multilevel type, which results, from the electric point of view, in a number of possible values of the threshold voltage higher than one, and their value depends on the number of bits being stored in the same cell. The amount of information which can be stored in a single multilevel cell is much increased over that which can be stored a two-level type cell.

To better understand the aspects of the present invention it is important to understand how the programming steps occur in multilevel Flash cells.

The writing operation of a Flash cell consists in varying the threshold voltage thereof by the desired amount, and storing electrons in the floating gate region.

To program the cell while obtaining threshold voltage distributions with a precision being sufficient for the realization of multiple levels, the voltage applied onto the control gate terminal can be variable with step-like increases starting from a minimum value to the attainment of a maximum value. The width of the voltage step, being the gate terminal under optimal conditions, is equal to the threshold jump which is to be obtained.

The use of a step-like gate voltage raises a timing problem to efficiently bring the programming step to an end. To minimize the duration of the programming times it is convenient to program a high number of cells in parallel.

The programming in parallel can occur by using an algorithm called "program & verify", in the course of whose execution each programming pulse is followed by a reading step of the cells, during the programming, to determine if they have reached the threshold value or not.

If a given cell has been correctly programmed, it will no longer receive any programming pulse, while the cells which have not reached a desired threshold yet will be reprogrammed by the same algorithm. To this aim some programming circuits are used which allow one to selectively apply, onto the drain terminals of the cells to be programmed, predetermined values of programming voltages.

In the meantime, also the voltage to be applied onto the source terminal is to be kept under control with great accuracy, both during the programming step and during the reading step.

For multilevel cells, the accurate control of the distributions of the cell thresholds becomes fundamental so that these are correctly positioned below the programmed threshold voltage values Vth for the written cells and below the erase verify potential for the erased cells.

Flash memory cells have a great capacity of maintaining the datum stored. However, on the order of some cells out of a million cells, there exist cells, called anomalous or faulty cells, which have a capacity of keeping or preserving the stored datum for much less time than that of the so called "typical" cell.

The presence of the anomalous cells in memory devices is a source of criticality during the storage and/or the reading of the data inserted and, naturally, in multilevel devices such criticality, induced by the anomalous cells, increases.

To maintain a high reliability level in Flash memory electronic devices the use of a storing method is known comprising an error correction code (ECC) which is a code generated during the storage so as to protect against an error present in the stored bits.

In reading, this error correction code (ECC) allows one to identify and to correct a datum read by a faulty cell positioned inside an array of N cells.

The code (ECC) of the known type has proved to be efficient in increasing the reliability of a memory electronic device. However, its use has a remarkable limitation.

It is known, in fact, that a common operation on the memory electronic devices is re-storage or bit manipulation. This is an operation which allows the storage transition of one or more cells of an array (such as the passage of the logic value of a cell from "0" to "1"), but which does not allow the contrary transition (such as to erase the cell to "0").

The re-storage operation or bit manipulation, is generally requested in software implementing a flash file system, i.e., in the algorithms implementing a file system.

Further to the re-storage operation, a new code (ECC) is redefined or recalculated but it is not certain that the new error correction code has, with respect to the old one, the re-storage transitions 1→0. In practice the new error correction code (ECC) redefined does not ensure that the code itself can be stored, since there exists a high probability that the transition 0→1 is required and the cells where the re-storage or bit manipulation has been carried out are covered.

A solution to this problem, already applied in some types of Flash memory electronic devices, for example those of the NAND type, has overcome the problem by prearranging a suitable writing area for the code (ECC) having dimensions equal to a multiple with respect to a minimum necessary area. Thus, during the re-storage, the code (ECC) can be updated or refreshed for some times and be re-written in different points. For example each N bytes, usually equal to 512, M are allocated, typically 16 additional bytes, accessible with dedicated commands, for the management of the ECC or error correction, independently from the fact that there exists an effective need of refreshing the memory content.

The re-written code (ECC) ensures the covering of the re-programmed areas.

Although advantageous under several aspects and substantially meeting the aim, the solution proposed shows however some drawbacks.

In fact, the solution is devoid of universality since it cannot be applied to all the typologies of Flash non-volatile memory devices.

For example, the solution cannot be applied to the devices of the "execute in place" type where the high requests for performances in reading require that the possible error correction occurs with a very small delay, in the order of a few nanoseconds.

In fact, the application of this solution in an "execute in place" device would involve that the reading of the data stored in an array of N cells and in the code (ECC) occurs simultaneously and that the possible error of a bit in one of the N cells of the array is instantaneously corrected.

Moreover, the solution proposed needs to read, in a serial way, all the codes (ECC), generated further to a bit manipulation and stored in the writing area arranged, until the valid one to be applied in the reading step for the correction is found. This naturally implies a remarkable increase of the access time for the device which penalizes its performances.

The technical problem underlying the present invention is that of devising a storing method for an array of N cells of a non-volatile memory device provided with code (ECC), the method having such functional characteristics as to allow to make the code (ECC) reliable and usable further to re-storage or bit manipulation of the array of N cells.

Another aim of the invention is that of providing a method which can be universally applied to all the non-volatile memory devices.

A further aim of the present invention is that of devising a device comprising a plurality of arrays of N cells of non-volatile memories with an error correction code (ECC), this code being quickly accessible and identifiable, avoiding the penalization of the access time and maintaining, in the meantime, the device performances high, as well as of avoiding the increase of the area intended for the storage of the memory cells overcoming the limits and the drawbacks of the solutions proposed by the prior art.

SUMMARY OF THE INVENTION

The solution idea underlying the present invention is that of using a first portion of the array of N cells to store data and a second portion of the array as writing area for each error correction code (ECC) defined further to a bit manipulation carried out on the array.

Advantageously, the use of a cell is provided to identify the activity of the code (ECC) so as to make it possible a reliable, simple, fast storing method, avoiding increases of storable area and limiting the access time.

In accordance with an embodiment of the invention, a storing method for an array of non-volatile memory cells comprising N cells and an error correction code comprises storing a piece of information in a first portion of the array comprising a first group (X) of said N cells while maintaining a second portion of said array, comprising a second group (N−X) of said cells, in an "erase" state. The method further comprises providing an association to a first error correction code for said first group (X) of cells of said first portion, by content of a first guard-cell indicating said first error correction code is active, said first error correction code is and said first guard-cell being stored in M cells, adjacent to said array, with M defined on the basis of the number N of cells of said array.

In accordance with another embodiment, a non-volatile memory device of the type comprises a matrix of non-volatile memory cells organized in sectors comprising rows of N cells and at least one error correction code, each row comprising a first portion including a group of said N cells and within which a datum is stored by means of a partial-storage step, and a second portion including a group (N−X) of said cells and being maintained in an "erase" state. A first error correction code is associated with the first group of cells by content of a first guard-cell indicating said first error correction code is active, said first error correction code and said first guard-cell being stored in M cells adjacent to said row, with M being defined on the basis of the number N of said cells of said array.

In accordance with another embodiment, a storing method for a row of non-volatile memory cells comprising N cells associated with M cells, wherein the N cells are divided into a first and second group of cells, comprises storing data in the first group of cells of the N cells in the row, storing in the M cells a first error correction code for the data stored in the first group of cells and an associated first enable bit indicating whether the first error correction code is active, and storing in the second group of cells of the N cells in the row a second error correction code for a subsequent update or bit manipulation of the data stored in the first group of cells and an associated second enable bit indicating whether the second error correction code is active.

In accordance with another embodiment, a row of non-volatile memory cells comprises N cells associated with M cells, wherein the N cells are divided into a first and second group of cells, and data is stored data in the first group of cells of the N cells in the row. A first error correction code for the data stored in the first group of cells and an associated first enable bit indicating whether the first error correction code is active is stored in the M cells. A second error correction code for a subsequent update or bit manipulation of the data stored in the first group of cells and an associated second enable bit indicating whether the second error correction code is active is stored in the second group of cells of the N cells in the row.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

With reference to the drawings, and in particular to FIGS. 2 to 5, a storing method according to the present invention is shown.

Figure 1:
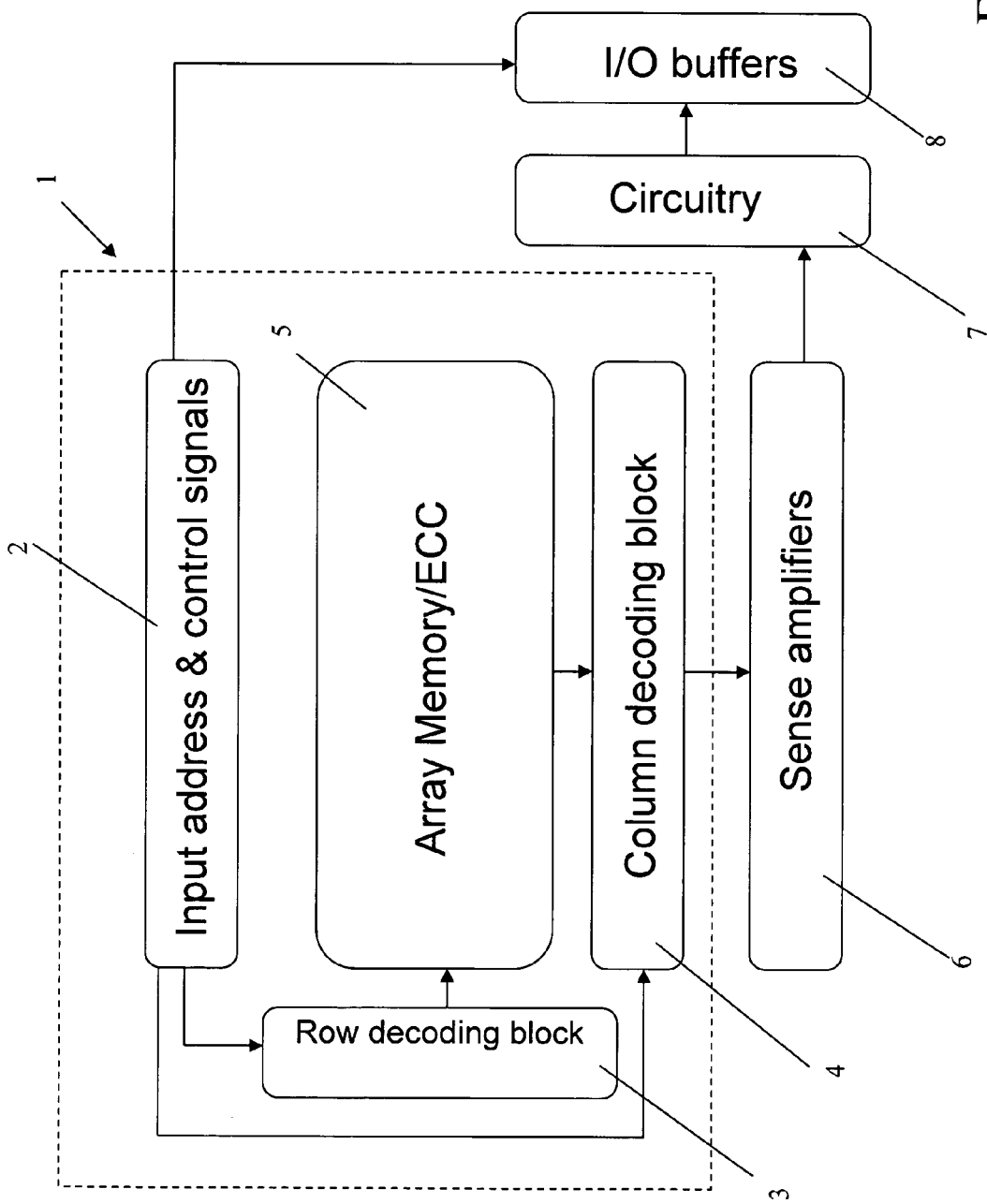
FIG. 1 schematically shows a block diagram of a non-volatile memory device.

The present invention also relates to a non-volatile memory device 1 which, by way of example, is schematically shown in FIG. 1 and which, by way of illustration, is considered as of the "execute in place" type.

The device 1 comprises a block 2 of input address & control signals, which controls a row decoder block 3 and a column decoder block 4, allowing to identify, respectively, a suitable row or array of a memory 5 and a suitable cell 11 of the same.

The memory 5 is a matrix of cells generally and suitably organized in sectors with each sector organized in rows and columns.

The device 1 comprises further blocks, which, as an example, are represented by a sense amplifier block 6, which includes all the read amplifiers, and a block circuitry 7, which allow to supply an Input/Output buffer 8 with an array 10 of data suitably corrected. The I/O buffer 8 can also be suitably controlled by the block 2.

Figure 2:
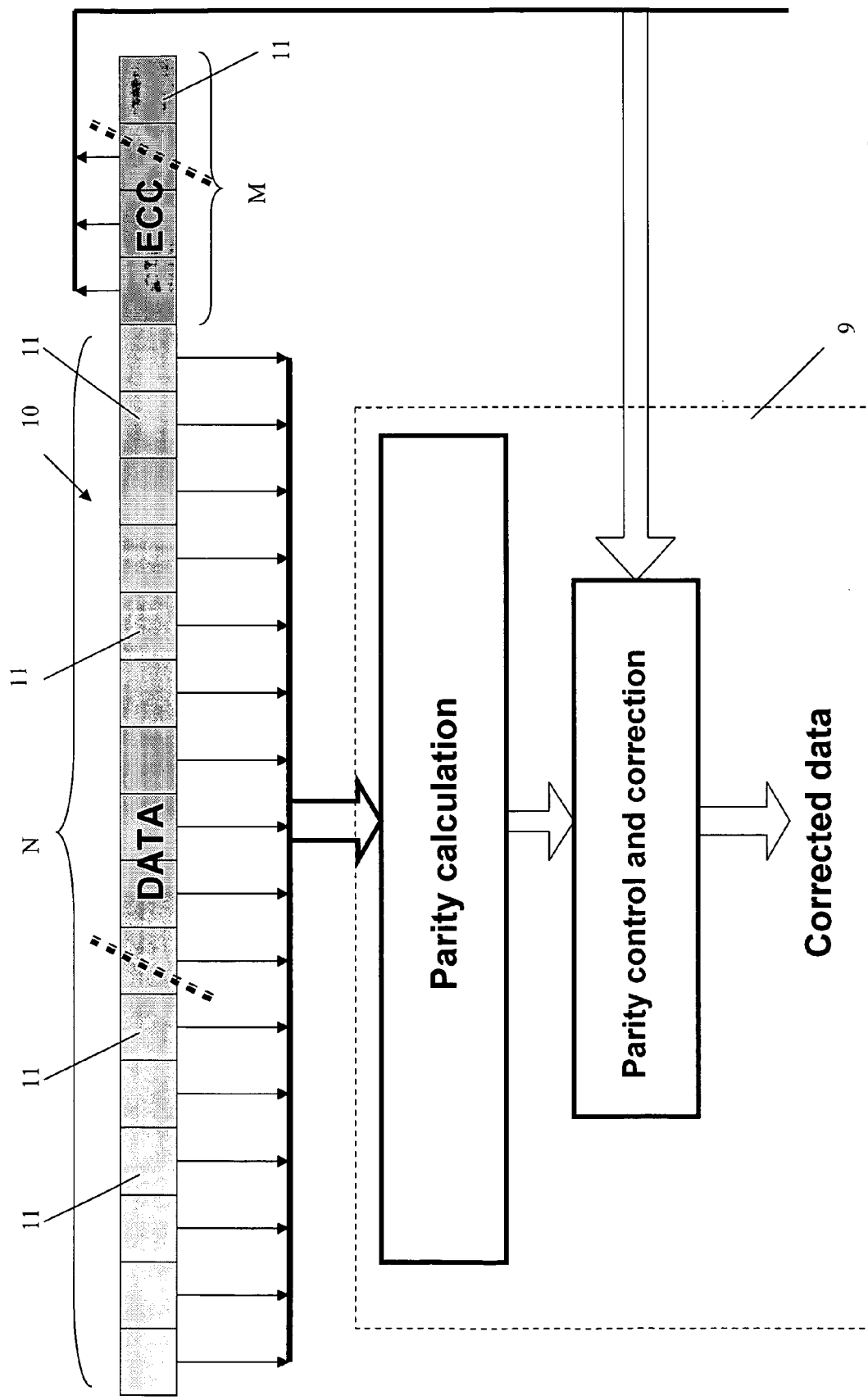
FIG. 2 shows an array of N bits with code (ECC) according to a "standard" storage.

The device 1, of the "execute in place" type, provides to store a portion of data or of information in an array 10 of the memory 5, by means of a storage step which will be called "standard", schematically shown in FIG. 2.

In particular, according to the described embodiment, for each cell 11 during the "standard" storage step, a single bit is stored.

Naturally, the cells 11 could be also multilevel and in this case in each cell a plurality of bits can be stored according to a suitable plurality of levels.

The "standard" storage step provides a storage step of the array 10 and an association step of an error correction code (ECC) with each stored array 10.

The code (ECC) is suitably stored in M cells 11 and it keeps trace of a possible error contained in a cell 11 of the array 10 created in the storage step, and it allows, in a successive reading step, a correction of the wrong bit.

Generally, a "standard" storage of an array 10 is dedicated to the storage of so called "static" data, i.e., of all those data the memory device 1 of the "execute in place" type must maintain unaltered until they are erased, by means of a suitable and predetermined erase operation.

The code (ECC) uses M cells 11, this dimension M generally depends on the type of memory device 1 and, for example, for the devices of the 1 bit per cell type, as in the preceding description, the M value is equal to $M=\log_2 N+1$. Considering, by way of example, N equal to 128 bits, M is equal to 8.

Figure 3:
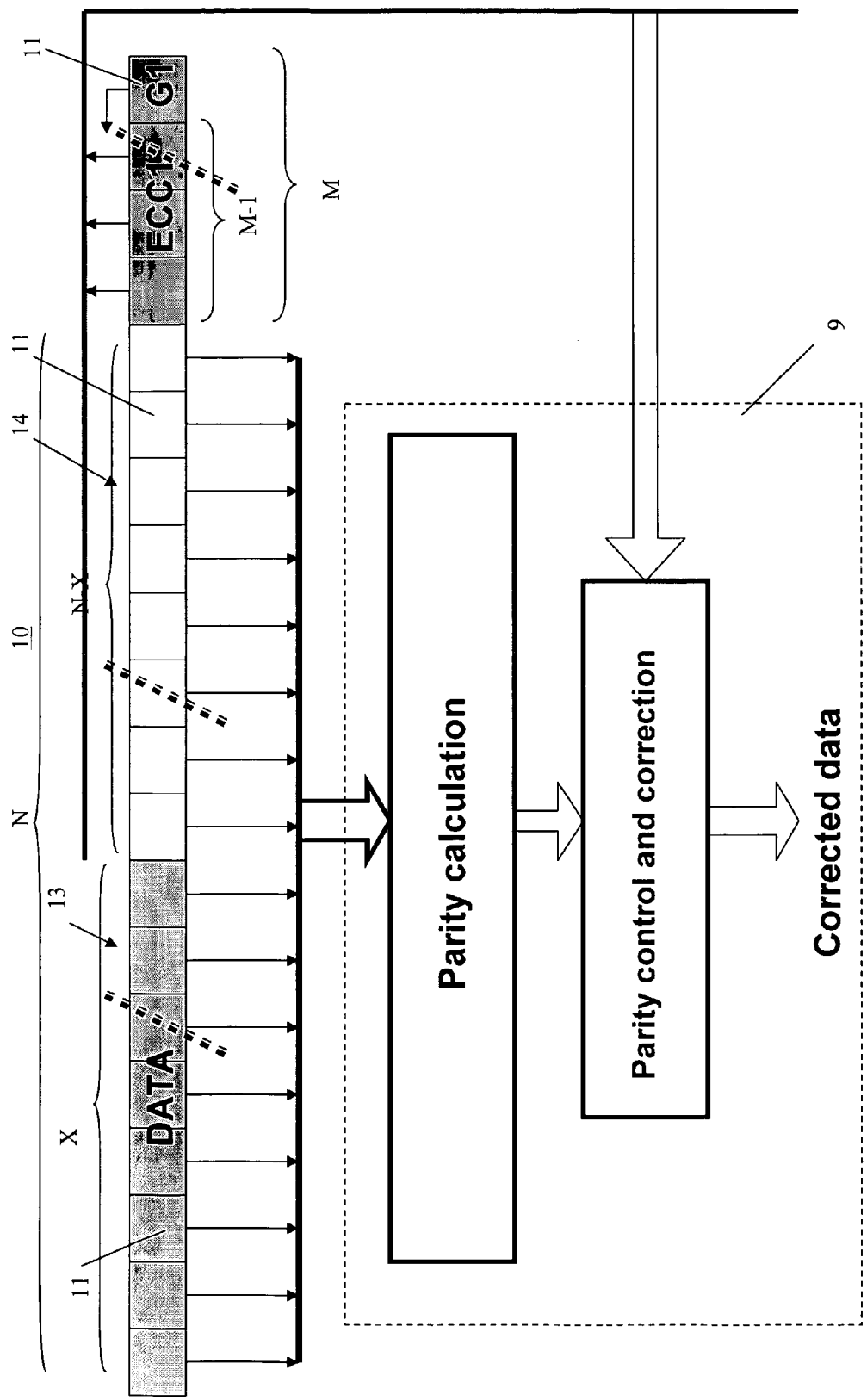
FIGS. 3, 4 and 5 show a string of N bits according to a storage sequence realized on the basis of the present invention.

Advantageously according to the present invention, a partial storing step can be applied to an array 10 of N cells 11, such step providing to store a portion of data or information only in a first portion 13 of each array 10, comprising X cells 11, and to maintain a second portion or writing area 14, comprising (N−X) cells 11, at the "erase" state, as schematically highlighted in FIG. 3.

The solution proposed allows to store, in each array 10, a smaller amount of data or bits, however against a greater reliability on the stored data.

According to a preferred embodiment, the first portion 13 contains N/2 cells 11 and the second portion or writing area 14 contains the remaining N/2 cells 11.

In particular, considering N equal to 128 bits the first portion 13 contains 64 bits and the second portion 14 contains the remaining 64 bits.

Advantageously according to the present invention a connection step provides the association of an error correction code (ECC1) for a portion of data or of information stored in the X cells 11 of the first portion 13; this code (ECC1) being stored in M cells adjacent to said array 10, where M is defined by $M=\log_2 N+1$ where N is the number of the overall bits of the array 10. Suitably, the code (ECC1), being generated on the basis of (N/2) cells, effectively occupies (M−1) cells 11 and, in the remaining cell 11, one enable bit or guard-cell (G1) is stored.

The enable bit or guard-cell (G1) allows to enable or activate and disable the code (ECC1) stored.

Advantageously, the present invention provides, during a possible update or bit manipulation of the data stored in the first portion 13, a first update step.

Suitably, the correction or update step provides the generation of a new code, second code (ECC2), for the data contained in the first portion 13 and manipulated during the update. The correction or update step also provides an-invalidation of the first code (ECC1), by disabling the first "guard-cell" (G1) and the storage of the second code (ECC2) and of a second guard-cell (G2).

Figure 4:
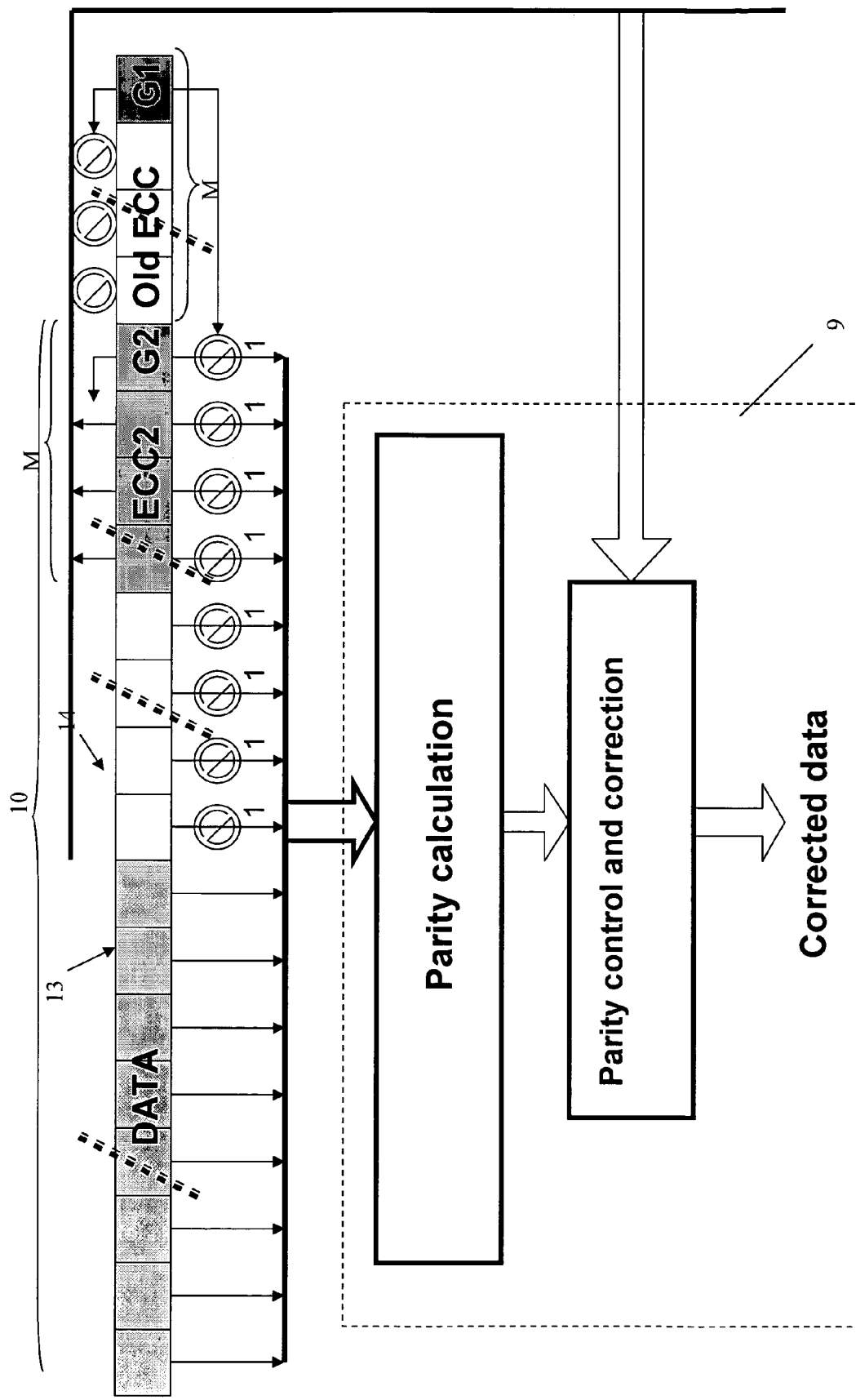
Figure 5:
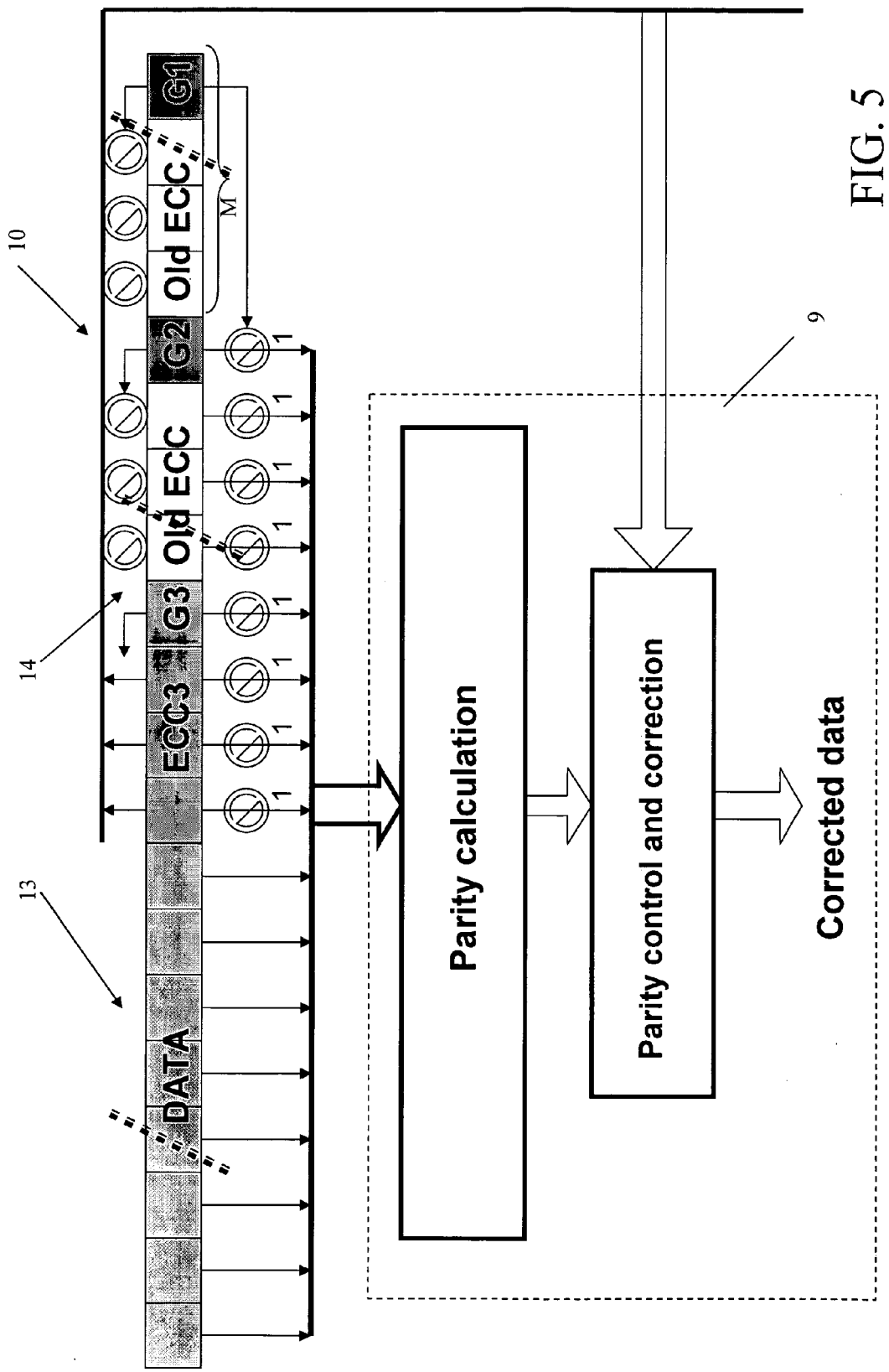

Advantageously according to the present invention, the second code (ECC2) and the guard cell (G2) are stored in M cells 11 belonging to the second portion or writing area 14 of the array 10, as highlighted in FIG. 4.

Naturally, the correction or update and storage step are repeatable for N/2M times, before using up all the N/2 cells 11 available in the writing area 14.

In the generic case, the correction or update and storage step are repeatable for a number of times equal to an integer of the value (N−X)/M during which successive codes (ECC3, ECC4, ... ) and corresponding guard cells (G3, G4, ... ) are generated. For example, in the case of an array made up of N=256 cells a piece of information is stored in the first portion 13 of 128 bits, M is equal to M=9 cells containing the error code (ECC) the enable or disable guard-cell (G) of the code (ECC) being included, and thus the correction or update step and the storage step can be repeated for fourteen times being the integer of the value $(N/2M)=(256/2*9)=14$.

A successive correction step, which can be performed by means of usual circuits 9, is thus provided on all the N cells 11, even if the real data are stored in the first portion 13, in particular in N/2 cells.

Figure 6:
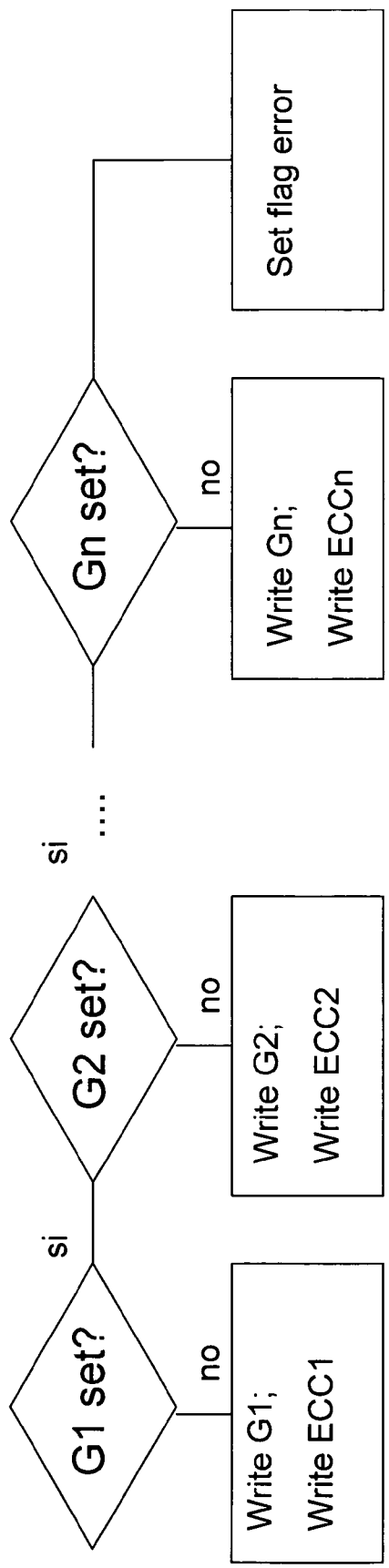
FIG. 6 shows a flow chart illustrating the steps of the method according to the present invention.

A successive reading step of the data stored in the array 10 provides, as shown in the flow chart of FIG. 6, a searching step of the active code (ECC1, ECC2, ... ), this searching step provides, by means of an input bit, to read the content of the guard-cell (G1) of the M cells adjacent to said array (10) and to check it, if the guard cell (G1) is not enabled, the input bit is shifted by M positions in correspondence with the second portion 14 of the array 10 until the enabled guard-cell (G2, G3, ... ), and thus the active error code (ECC), is identified. Said shift being allowed for (N−X)/M times to occupy at the most the entire second portion 14 of the array 10.

The storing method the invention is based on provides to store the arrays 10 present in at least one sector of the memory 5 of the device 1 according to the partial-storage step renouncing the data storage capacity in favor of the reliability and of the correctness of the data stored.

Naturally, a further embodiment of the present invention can provide to store each array 10 of the sectors of the memory 5 of a device 1 by means of the partial-storage step thus realizing a highly reliable device 1 even if with reduced storage capacity.

There is a further embodiment in case the N cells 11 are multilevel.

In the case of an array 10 comprising N cells 11 containing two bits per cell and providing an error correction code ECC which allows to correct one bit of a cell (11) of the information stored in the first portion 13 of the array 10, the value M of cells occupied by the error code and by the guard cell is equal to $M=\log_2 N+1$, the method and the device being analogous to what has been described above. In particular, the error correction codes (ECC1, ECC2, . . . ) occupy at the most (M−1) of said M cells and said guard cells (G1, G2, . . . ) occupy at least one cell of said M cells.

Instead in the case of an array 10 comprising N cells 11 containing two bits per cell and providing an error correction code ECC which allows to correct two bits of a same cell (11), of the information stored in the first portion 13 of the array 10, the value M of cells occupied by the error code and by the guard cell is equal to $M=\log_2 N+2$. In particular, the error correction codes (ECC1, ECC2, . . . ) occupy at the most (M−1) of said M cells, said guard cells (G1, G2, . . . ) occupy at least one cell of said M cells.

The method according to the present invention thus allows to store, in a reliable way, the data at least in one sector of the memory 5 of the device 1, also further to a bit manipulation of the data stored in the first portion 13 of the array 10, allowing to store the error correction code (ECC) regenerated in the second portion 14 of the array 10 and to prearrange an activation bit or guard cell (G) which allows a quick and fast access to the active code (ECC).

A further advantage of the present invention is that of realizing a storage method managed without area overhead, i.e., maintaining the usual and standard dimensions of the memory 5 of the device 1 and employing the usual circuitry during the correction step without cost increase.

Another advantage of the present invention is that of realizing a storage method which allows to avoid any penalization on the time for accessing to the error correction code (ECC) of the data stored.

Another advantage of the present method is that of the flexibility of use, in fact, in a memory device, alternatively in view of the uniformity between the "standard" method and the partial-storage method, it is possible to choose the method to be used for the data to be stored in the various memory sectors, choice that can be made, for example, on the basis of the typology of the data themselves if "static" or "dynamic".

Although preferred embodiments of the device of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A storing method for an array of non-volatile memory cells comprising N cells and an error correction code, comprising:
    storing a piece of information in a first portion of the array comprising a first group (X) of said N cells while maintaining a second portion of said array, comprising a second group (N−X) of said cells, in an "erase" state; and
    providing an association to a first error correction code for said first group (X) of cells of said first portion using a first guard-cell to indicate said first error correction code is active.

2. The method according to claim 1, wherein the indication of the association is provided on said N cells of said first portion of said array.

3. The method according to claim 1, further comprising, during an update or bit manipulation of said datum stored in said first portion of said array:
    generating a second error correction code for the datum in said first portion manipulated by said update or bit manipulation, with simultaneous invalidation of said first error correction code by disabling said first guard-cell;
    storing said second error correction code and an enable bit in a second guard-cell to indicate said second error correction code is active; and
    wherein generating and storing are repeatable for a number of times equal to an integer of the value (N−X)/M.

4. The method according to claim 3, wherein said array is divided into two portions, the first portion containing N/2 of said N cells and the second portion containing the remaining N/2 of said N cells, and wherein update or bit manipulation is repeatable for a number of times equal to N/2 M.

5. The method according to claim 3, wherein said N cells of said array contain one bit per cell and have said value M equal to $M=\log_2 N+1$ and said guard cells constitute at least one cell of said M cells.

6. The method according to claim 3, further including reading said data stored in said array comprising searching for an active one of the error correction codes, searching comprising providing a reading, by means of an input bit, of the content of said guard-cell stored in said M cells adjacent to said array and, if a disable indication is present, then providing a shift of said input bit of M positions in correspondence with said second portion of said array until an enabled guard-cell is identified and reading the corresponding error correction code associated with the enabled guard-cell, said shift being allowed for a number of times equal to an integer of the value (N−X)/M.

7. The method according to claim 6 wherein said N cells of said array contain two bits per cell, said error correction code providing the correction of one bit per one cell of said information in said first portion, said value M being equal to $M=\log_2 N+1$, and said guard cells constituting at least one cell of said M cells.

8. The method according to claim 6 wherein said N cells of said array contain two bits per cell and providing an association comprises providing a correction of two bits of a same cell of said datum stored in said first portion, said value M being equal to $M=\log_2 N+2$, and said guard cells constituting at least one cell of said M cells.

9. A non-volatile memory device of the type comprising:
    a matrix of non-volatile memory cells organized in sectors comprising rows of N cells and at least one error correction code, each row comprising a first portion including a group of said N cells within which a datum is stored by means of a partial-storage step, and a second portion including a group (N−X) of said cells and being maintained in an "erase" state;
    a first error correction code being associated with the first group of cells; and
    a first guard-cell storing a first enable bit to indicate whether said first error correction code is active, said first error correction code and said first enable bit being stored in M cells adjacent to said row, with M being defined on the basis of the number N of said cells of said array.

10. The device according to claim 9 wherein said first portion contains N/2 of said N cells and said second portion contains the remaining N/2 of said N cells and wherein correction or update is repeatable for N/2 M times being M equal to $M=\log_2 N+1$.

11. The device according to claim 9 further comprising an area for a second error correction code and a second guard-cell storing a second enable bit, generated by a correction or update of said datum stored in said first portion of the row, said second error correction code and said second guard cell being stored in M cells belonging to said second portion, said second error correction code and said second enable bit, as well and successive error correction codes and corresponding successive guard-cells being obtained by successive corrections or updates and being generated at the most for a number of times equal to an integer given by the ratio $(N-X)/M$.

12. The device according to claim 11 wherein said N cells, containing one bit per cell, have said value M equal to $M=\log_2 N+1$ and in that said error correction codes occupy at the most $(M-1)$ of said M cells and wherein said enable bits occupy at least one cell of said M cells.

13. The device according to claim 11 wherein said N cells of said array are multilevel, containing two bits per cell, one datum being stored in said first portion of said row, said error correction codes providing the correction of one bit per one cell of said first portion, said value M being equal to $M=\log_2 N+1$, said error correction codes occupying at the most $(M-1)$ of said M cells and said guard cells occupying at least one cell of said M cells.

14. The device according to claim 11 wherein said N cells of said array are multilevel, containing two bits per cell, one datum being stored in said first portion of said row, said error correction codes providing the correction of two bits per one cell of said first portion, said value M being equal to $M=\log_2 N+2$, said error correction codes occupying at the most $(M-1)$ of said M cells and said enable bit occupying at least one cell of said M cells.

15. A storing method for a row of non-volatile memory cells comprising N cells associated with M cells, wherein the N cells are divided into a first and second group of cells, comprising:
    storing data in the first group of cells of the N cells in the row;
    storing in the M cells a first error correction code for the data stored in the first group of cells and an associated first enable bit indicating whether the first error correction code is active; and
    storing in the second group of cells of the N cells in the row a second error correction code for a subsequent update or bit manipulation of the data stored in the second group of cells and an associated second enable bit indicating whether the second error correction code is active.

16. The method of claim 15 further comprising marking the first enable bit to indicate that the first error correction code is inactive if the second error correction code and second enable bit are stored in the second group of cells of the N cells in the row.

17. The method of claim 15 wherein the non-volatile memory cells store one bit per cell.

18. The method of claim 15 wherein the non-volatile memory cells store at least two bits per cell.

19. The method of claim 15 wherein the M and N cells of the row are contiguous.

20. A row of non-volatile memory cells comprising N cells associated with M cells, wherein the N cells are divided into a first and second group of cells, and data is stored data in the first group of cells of the N cells in the row, and a first error correction code for the data stored in the first group of cells and an associated first enable bit indicating whether the first error correction code is active is stored in the M cells, and a second error correction code for a subsequent update or bit manipulation of the data stored in the second group of cells and an associated second enable bit indicating whether the second error correction code is active is stored in the second group of cells of the N cells in the row.

21. The row of claim 20 wherein the first enable bit is marked to indicate that the first error correction code is inactive if the second error correction code and second enable bit are stored in the second group of cells of the N cells in the row.

22. The row of claim 20 wherein the non-volatile memory cells store one bit per cell.

23. The row of claim 20 wherein the non-volatile memory cells store at least two bits per cell.

24. The row of claim 20 wherein the M and N cells of the row are contiguous.

25. A storing method for a row of non-volatile memory cells comprising N cells associated with M cells, wherein the N cells are divided into a first and second group of cells, comprising:
    storing data in the first group of cells of the N cells in the row;
    storing in the M cells a first error correction code for the data stored in the first group of cells; and
    storing in the second group of cells of the N cells in the row a second error correction code for a subsequent update or bit manipulation of the data stored in the first group of cells.

26. The method of claim 25 further comprising providing for each error correction code an enable bit indicative of whether the associated error correction code is active, the method further comprising marking the enable bit for the first error correction code as inactive if the second error correction code is stored in the second group of cells of the N cells in the row.

27. A row of non-volatile memory cells comprising N cells associated with M cells, wherein the N cells are divided into a first and second group of cells, and data is stored data in the first group of cells of the N cells in the row, and a first error correction code for the data stored in the first group of cells is stored in the M cells, and a second error correction code for a subsequent update or bit manipulation of the data stored in the first group of cells is stored in the second group of cells of the N cells in the row.

28. The row of claim 27 wherein each error correction code is provided with an enable bit indicative of whether the associated error correction code is active, and the enable bit for the first error correction code is marked to indicate that the first error correction code is inactive if the second error correction code is stored in the second group of cells of the N cells in the row.

* * * * *